(12) United States Patent
Kobayashi et al.

(10) Patent No.: US 12,181,022 B1
(45) Date of Patent: Dec. 31, 2024

(54) SPEED REDUCTION MECHANISM

(71) Applicant: MITSUBA Corporation, Gunma (JP)

(72) Inventors: Motoaki Kobayashi, Gunma (JP); Teppei Tokizaki, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/593,950

(22) Filed: Mar. 3, 2024

(30) Foreign Application Priority Data

Jul. 24, 2023 (JP) ................................. 2023-119733

(51) Int. Cl.
*F16H 1/28* (2006.01)
(52) U.S. Cl.
CPC ....................................... *F16H 1/28* (2013.01)
(58) Field of Classification Search
CPC ... F16H 1/28; F16H 55/17; F16H 1/30; F16H 1/36
See application file for complete search history.

(56) References Cited

U.S. PATENT DOCUMENTS

| | | | | |
|---|---|---|---|---|
| RE26,476 E | * | 10/1968 | Kuehnle | F16H 1/30 74/424.5 |
| 8,157,691 B2 | * | 4/2012 | Stanovskoy | F16H 1/32 475/180 |
| 8,814,748 B2 | * | 8/2014 | Osterlanger | F16H 1/30 475/333 |
| 9,267,587 B2 | * | 2/2016 | Abevi | F16H 25/2252 |
| 9,789,898 B2 | * | 10/2017 | Galehr | B62D 5/008 |
| 9,791,026 B2 | * | 10/2017 | Saxstetter | E05F 15/622 |
| 10,871,217 B2 | * | 12/2020 | Albert | F16H 1/30 |
| 10,965,187 B2 | * | 3/2021 | Albert | H02K 5/1737 |
| 11,136,016 B2 | * | 10/2021 | Weh | F04B 9/02 |
| 11,719,310 B2 | * | 8/2023 | Tokizaki | H02K 7/003 74/414 |

FOREIGN PATENT DOCUMENTS

JP        2001090792        4/2001

* cited by examiner

*Primary Examiner* — Derek D Knight
(74) *Attorney, Agent, or Firm* — JCIPRNET (57) ABSTRACT

A speed reduction mechanism has an increased reduction ratio while achieving downsizing. A speed reduction mechanism 30 includes a rotating shaft 10, a pinion gear 11 including a first tooth portion 11a extending spirally along a longitudinal direction Q1 of the rotating shaft 10, three planetary gears 12 including spiral second tooth portions 12e and arranged side by side in a circumferential direction Q2 of the rotating shaft 10, a housing portion 14 housing the three planetary gears 12, and an internal gear 13 including a spiral third tooth portion 13a meshing with the second tooth portions 12e. The first tooth portion 11a has at least a part of a tooth profile cross section formed in an arc shape. The second tooth portion 12e meshes with the first tooth portion 11a in a state of being in contact with a portion where the tooth profile cross section is arc-shaped.

2 Claims, 11 Drawing Sheets

SPEED REDUCTION MECHANISM

CROSS-REFERENCE TO RELATED APPLICATION

This application claims the priority benefits of Japanese application no. 2023-119733, filed on Jul. 24, 2023. The entirety of the above-mentioned patent application is hereby incorporated by reference herein and made a part of this specification.

BACKGROUND

Technical Field

The disclosure relates to a speed reduction mechanism using planetary gears.

Description of Related Art

As an example of the speed reduction mechanism using planetary gears, Patent Document 1 (Japanese Patent Application Laid-Open No. 2001-90792) discloses a speed reduction mechanism that includes a sun gear, three planetary gears each revolving around the sun gear while rotating and meshing with the sun gear, and a fixed internal gear meshing with the three planetary gears.

For the speed reduction mechanism described in Patent Document 1 above, it is desired to secure even larger output torque while keeping the size small, and therefore, it is necessary to further increase the reduction ratio while keeping the size of the speed reduction mechanism small.

In the case of the speed reduction mechanism described in Patent Document 1, if the reduction ratio is to be further increased, it is necessary to reduce the number of planetary gears. As the number of planetary gears decreases, the strength of the speed reduction mechanism decreases.

On the other hand, if the number of planetary gears is reduced to ensure the strength of the speed reduction mechanism, it is necessary to increase the diameter of each planetary gear, and there is a concern that the speed reduction mechanism may become large in size.

The disclosure provides a speed reduction mechanism that is capable of increasing the reduction ratio while achieving downsizing.

SUMMARY

One aspect of the disclosure includes a rotating shaft; a first gear provided on an outer peripheral portion of the rotating shaft and including a first tooth portion that extends spirally along a longitudinal direction of the rotating shaft; a plurality of second gears each including a spiral second tooth portion that meshes with the first tooth portion and arranged side by side in a circumferential direction of the rotating shaft; a housing portion housing the plurality of second gears; and a third gear provided on an inner peripheral portion of the housing portion and including a spiral third tooth portion that meshes with the second tooth portion, in which the first tooth portion has at least a part of a tooth profile cross section formed in an arc shape, and the second tooth portion meshes with the first tooth portion in a state of being in contact with a portion where the tooth profile cross section is arc-shaped.

In another aspect of the disclosure, at least three second gears are arranged side by side in the circumferential direction of the rotating shaft.

In another aspect of the disclosure, in a case where a pitch circle radius of the second gear is R1, a center-to-center distance from a rotation center of the rotating shaft to a rotation center of the second gear is L1, and an angle calculated by a formula of (180°(sum of interior angles of triangle)−90°)−(360°/number of the second gears/2) is θ, the pitch circle radius R1<(the center-to-center distance L1×cos θ).

In the speed reduction mechanism, it is possible to increase the reduction ratio while achieving downsizing.

DESCRIPTION OF THE EMBODIMENTS

Hereinafter, embodiments of the disclosure will be described in detail with reference to the drawings.

Figure 1:
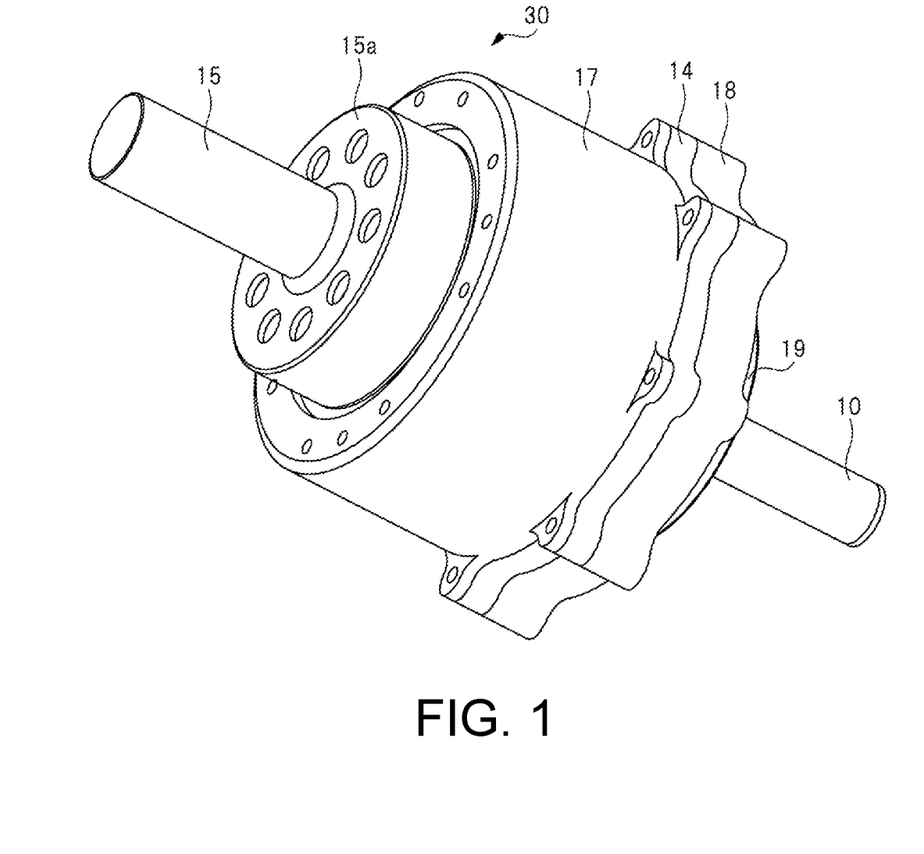
FIG. 1 is an external perspective view illustrating the structure of the speed reduction mechanism according to the disclosure.
Figure 2:
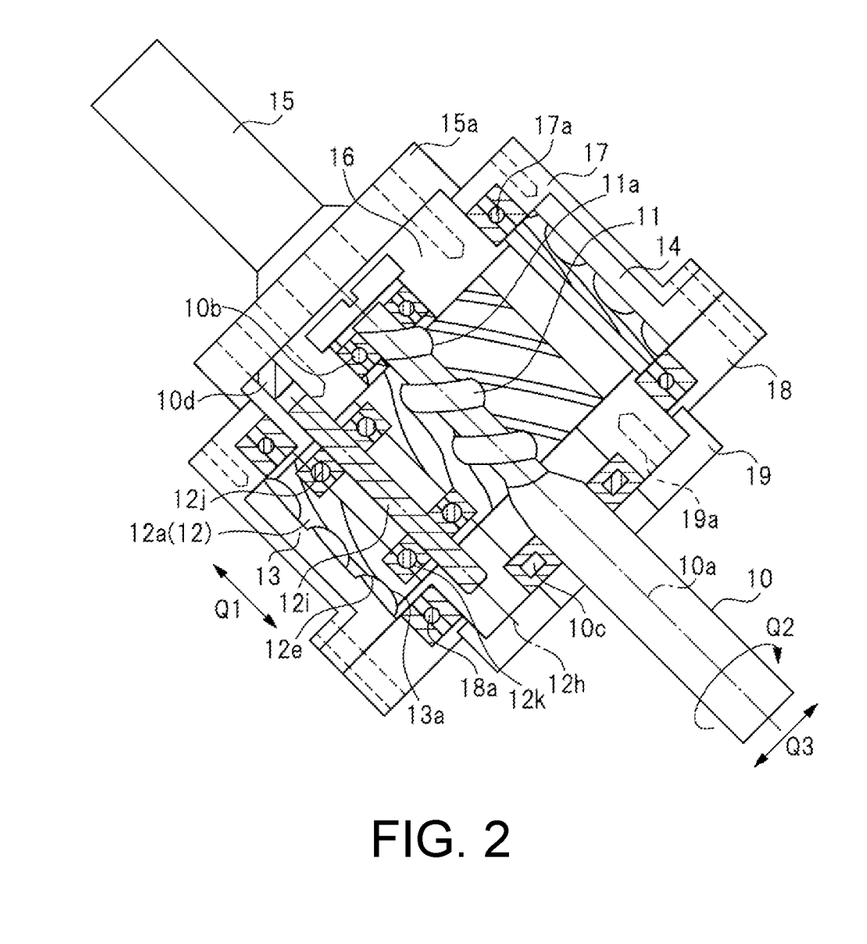
FIG. 2 is a cross-sectional view illustrating the internal structure of the speed reduction mechanism in FIG. 1.
Figure 3:
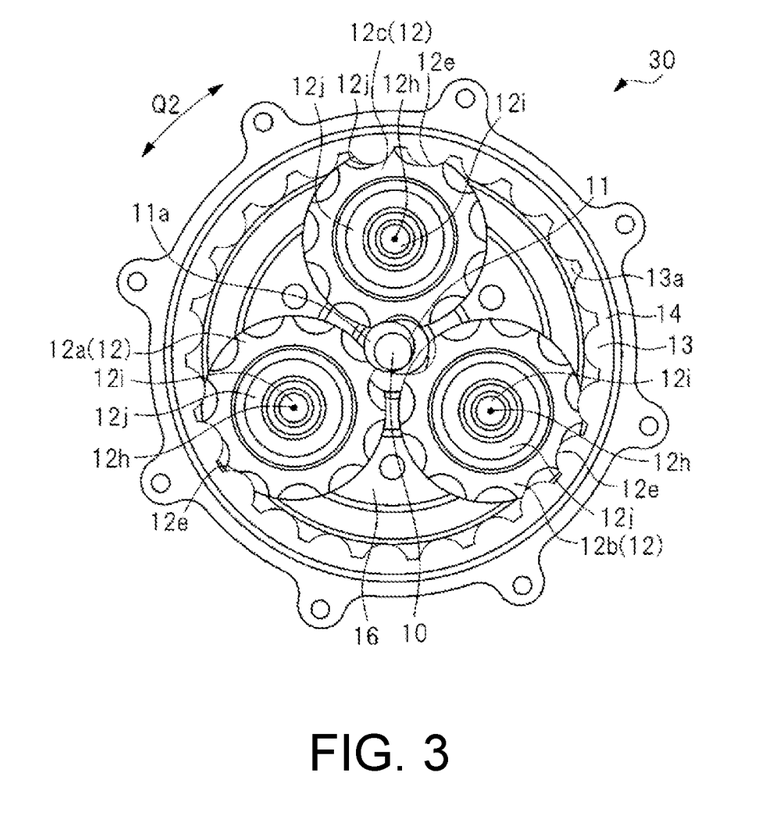
FIG. 3 is an internal plan view illustrating the arrangement of the planetary gears (second gears) of the speed reduction mechanism in FIG. 1.
Figure 4:
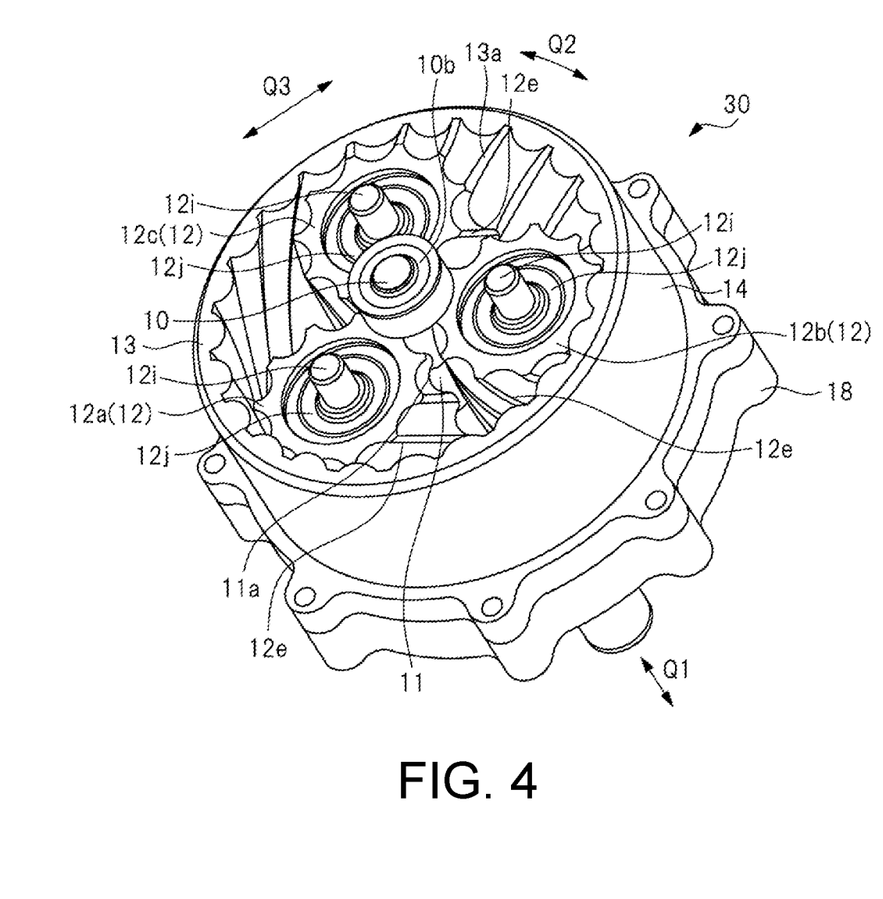
FIG. 4 is a perspective view illustrating a meshing state between the sun gear and the planetary gears and a meshing state between the planetary gears and the fixed internal gear (third gear) in the speed reduction mechanism of FIG. 1.
Figure 5:
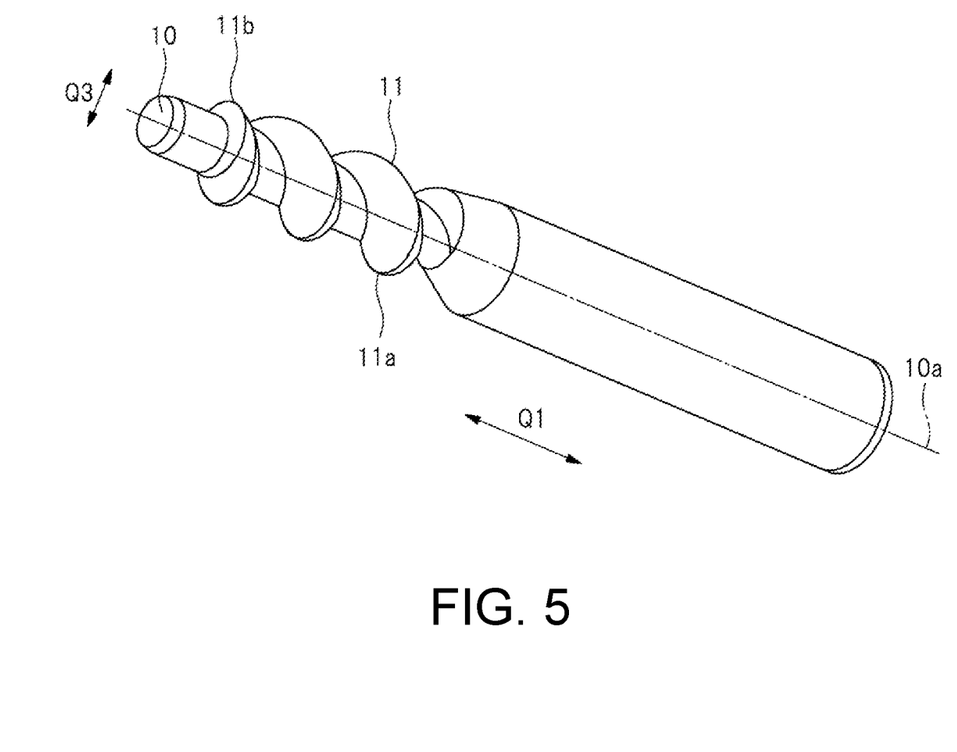
FIG. 5 is an external perspective view illustrating the structure of the sun gear (first gear) of the speed reduction mechanism in FIG. 1.
Figure 6:
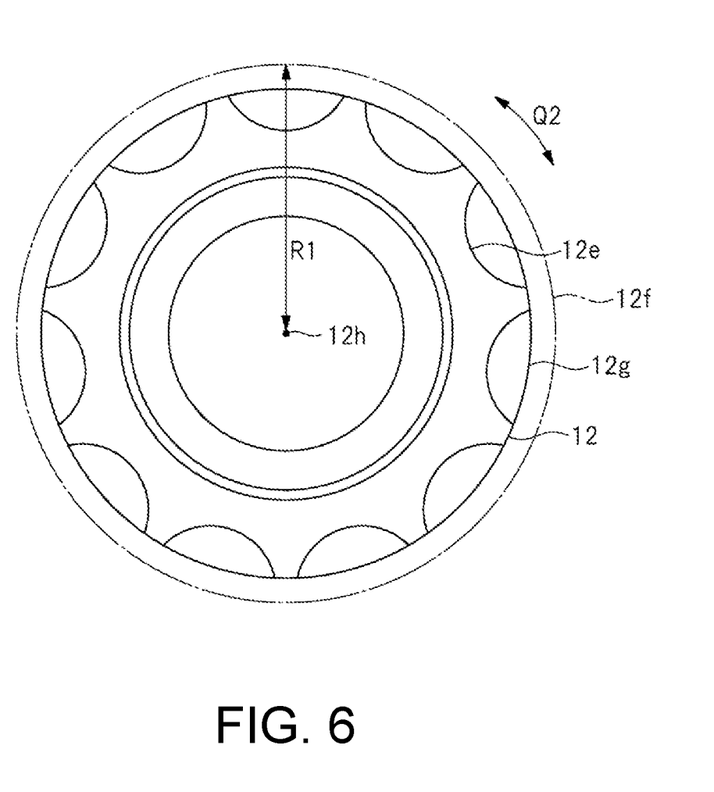
FIG. 6 is a plan view illustrating the structure of the planetary gear (second gear) of the speed reduction mechanism in FIG. 1.

FIG. 1 is an external perspective view illustrating the structure of the speed reduction mechanism of this embodiment, FIG. 2 is a cross-sectional view illustrating the internal structure of the speed reduction mechanism in FIG. 1, and FIG. 3 is an internal plan view illustrating the arrangement of the planetary gears (second gears) of the speed reduction mechanism in FIG. 1. Furthermore, FIG. 4 is a perspective view illustrating a meshing state between the sun gear and the planetary gears and a meshing state between the planetary gears and the fixed internal gear (third gear) in the speed reduction mechanism of FIG. 1, FIG. 5 is an external perspective view illustrating the structure of the sun gear (first gear) of the speed reduction mechanism in FIG. 1, and FIG. 6 is a plan view illustrating the structure of the planetary gear (second gear) of the speed reduction mechanism in FIG. 1.

The speed reduction mechanism 30 of this embodiment is a mechanism that is capable of causing three or more planetary gears 12 respectively meshing with the sun gear and the fixed internal gear to revolve through rotation of the sun gear provided on a rotating shaft 10, which is the input shaft, thereby slowing down the rotation of an output shaft 15, which rotates with the revolution of the planetary gears 12, relative to the rotation of the input shaft.

The structure of the speed reduction mechanism 30 will be illustrated with reference to FIG. 1 to FIG. 6. First, a case where three planetary gears 12 are provided will be described. As shown in FIG. 3 and FIG. 4, the speed reduction mechanism 30 includes the rotating shaft 10 that is the input shaft, a pinion gear (first gear) 11 that includes a first tooth portion 11a provided on the outer peripheral portion of the rotating shaft 10, and three planetary gears 12a, 12b, and 12c, each of which is a second gear that meshes with the first tooth portion 11a. It should be noted that the three planetary gears 12a, 12b, and 12c each include a second tooth portion 12e that meshes with the first tooth portion 11a, and are arranged side by side at substantially equal intervals in the circumferential direction Q2 of the rotating shaft 10.

Further, the speed reduction mechanism 30 includes a cylindrical housing portion 14 that houses the three planetary gears 12a, 12b, and 12c, and an internal gear (third gear) 13 that is provided on the inner peripheral portion of the housing portion 14 and includes a third tooth portion 13a to mesh with the second tooth portions 12e of the three planetary gears 12a, 12b, and 12c.

The pinion gear 11, which is the first gear, is a sun gear that rotates in the speed reduction mechanism 30. The pinion gear 11 is provided integrally with the rotating shaft 10 on the outer peripheral portion of the rotating shaft 10, and includes the first tooth portion 11a that extends spirally along the longitudinal direction Q1 of the rotating shaft 10, as shown in FIG. 5. The first tooth portion 11a has a single tooth, and the pinion gear 11 is also called a single tooth pinion gear. That is, the structure is made so that only one tooth portion (first tooth portion 11a) is formed on the cut surface in the radial direction Q3 at any position in the longitudinal direction Q1 of the rotating shaft 10. Furthermore, in the tooth profile (tooth profile cross section) of the cut surface of the rotating shaft 10 in the radial direction Q3, the first tooth portion 11a has an arc-shaped portion 11b, at least a part of which is formed in an arc shape.

The three planetary gears 12a, 12b, and 12c, which are the second gears, are arranged side by side in the circumferential direction Q2 of the rotating shaft 10, as shown in FIG. 4. As shown in FIG. 6, each of the three planetary gears 12a, 12b, and 12c includes the spiral second tooth portion 12e. The second tooth portion 12e meshes with the first tooth portion 11a in a state of being in contact with a portion formed with an arc-shaped tooth profile (tooth profile cross section) of the cut surface of the pinion gear 11 shown in FIG. 5. In other words, the second tooth portions 12e of the three planetary gears 12a, 12b, and 12c mesh with the first tooth portion 11a in a state of being in contact with the arc-shaped portion 11b of the first tooth portion 11a of the pinion gear 11.

As shown in FIG. 3 and FIG. 4, the internal gear 13, which is the third gear, is provided on the inner peripheral portion of the cylindrical housing portion 14, and includes the third tooth portion 13a that meshes with the second tooth portions 12e of the planetary gears 12a, 12b, and 12c. The third tooth portion 13a is formed in a spiral shape on the inner peripheral portion of the cylindrical housing portion 14. It should be noted that, in the speed reduction mechanism 30 of this embodiment, the internal gear 13 is a fixed internal gear.

Next, the detailed internal structure of the speed reduction mechanism 30 will be described. As shown in FIG. 1 and FIG. 2, the rotating shaft 10, which is the input shaft and has the pinion gear 11 on the outer peripheral portion thereof, is rotatably supported by a bearing 10b and a bearing 10c. The rotating shaft 10 rotates around a rotation center 10a. The bearing 10b and the bearing 10c are respectively fixed to a planetary carrier 16, and the planetary carrier 16 is rotatably attached to the rotating shaft 10 via the bearing 10b and the bearing 10c.

It should be noted that the planetary carrier 16 is formed in a cylindrical shape, and the outer peripheral portion of the planetary carrier 16 is rotatable with respect to the outer peripheral frame of the speed reduction mechanism 30 via a bearing 17a and a bearing 18a. That is, the planetary carrier 16 is rotatable with respect to a bearing holder 17 and a bearing holder 18, which are the outer peripheral frame of the speed reduction mechanism 30, via the bearing 17a and the bearing 18a.

Moreover, a fixing portion 15a including the output shaft 15 is attached to the planetary carrier 16 by a pin 10d. Therefore, when the planetary carrier 16 rotates, the fixing portion 15a and the output shaft 15 rotate together with the rotation of the planetary carrier 16. Similarly, a fixing portion 19 fixed to the planetary carrier 16 via a pin 19a rotates together with the rotation of the planetary carrier 16 when the planetary carrier 16 rotates. In the speed reduction mechanism 30, the rotating shaft 10 and the output shaft 15 are arranged on substantially the same axis.

The three planetary gears 12a, 12b, and 12c, each including the second tooth portion 12e that meshes with the first tooth portion 11a of the pinion gear 11 provided on the rotating shaft 10, are respectively provided on three fixed shafts 12i that are attached to the planetary carrier 16. Specifically, each of the three fixed shafts 12i is fixed to the planetary carrier 16 and is rotatable around the rotating shaft 10. The three planetary gears 12a, 12b, and 12c are provided to be rotatable with respect to the fixed shafts 12i via bearings 12j and 12k, respectively. As shown in FIG. 4, the second tooth portions 12e of the three planetary gears 12a, 12b, and 12c are twisted with respect to the gear shafts. That is to say, each of the three planetary gears 12a, 12b, and 12c is a helical gear.

In addition, since the three planetary gears 12a, 12b, and 12c are respectively provided to be rotatable with respect to the fixed shafts 12i, a rotation center 12h of each of the three planetary gears 12a, 12b, and 12c is also the axial center of the fixed shaft 12i.

Further, the cylindrical housing portion 14 is provided on the inner peripheral portion of the bearing holder 17. As shown in FIG. 2 to FIG. 4, the inner peripheral portion of the housing portion 14 is formed with the internal gear 13 having the third tooth portion 13a that meshes with the second tooth portions 12e of the three planetary gears 12a, 12b, and 12c. In the speed reduction mechanism 30 of this embodiment, the internal gear 13 is a gear fixed so as not to rotate. Further, the third tooth portion 13a is twisted with respect to the gear shaft, and the internal gear 13 of the housing portion 14 that meshes with the three planetary gears 12a, 12b, and 12c is also a helical gear.

Based on the above structure, in the speed reduction mechanism 30 of this embodiment, the first tooth portion 11a of the pinion gear 11 of the rotating shaft 10 meshes with the second tooth portions 12e of the three planetary gears 12a, 12b, and 12c, and the second tooth portions 12e of the three planetary gears 12a, 12b, and 12c mesh with the third tooth portion 13a of the internal gear 13. Therefore, when the rotating shaft 10 rotates, the three planetary gears 12a, 12b, and 12c rotate, respectively. At this time, the internal gear 13 that meshes with the three planetary gears 12a, 12b, and 12c is a gear that does not rotate, and the three planetary gears 12a, 12b, and 12c are respectively provided to be rotatable with respect to the fixed shafts 12i that are rotatably attached around the rotating shaft 10. Thereby, each of the three planetary gears 12a, 12b, and 12c revolves around the rotating shaft 10. The planetary carrier 16 rotates as the three planetary gears 12a, 12b, and 12c revolve, and the output shaft 15 fixed to the planetary carrier 16 also rotates. Therefore, when the rotating shaft 10 rotates, the output shaft 15, which is arranged on substantially the same axis as the rotating shaft 10, rotates while being decelerated.

It should be noted that the second tooth portion 12e of each of the three planetary gears 12a, 12b, and 12c meshes with the first tooth portion 11a of the pinion gear 11 in a state of being in contact with the portion formed with an arc-shaped tooth profile (tooth profile cross section) of the cut surface of the pinion gear 11 shown in FIG. 5. That is, the second tooth portions 12e of the three planetary gears 12a, 12b, and 12c mesh in a state of being in contact with the arc-shaped portion 11b of the first tooth portion 11a of the pinion gear 11. In other words, the second tooth portions 12e of the three planetary gears 12a, 12b, and 12c mesh by abutting against the arc-shaped portion 11b of the first tooth portion 11a of the pinion gear 11.

Here, for example, in a case where a speed reduction mechanism includes a sun gear and three planetary gears that mesh with the sun gear and revolve around the sun gear while rotating, and the sun gear and the three planetary gears are spur gears, in order to further increase the reduction ratio, it is necessary to reduce the number of planetary gears from three to two. At this time, when the number of planetary gears is reduced from three to two, the strength of the speed reduction mechanism is reduced to two-thirds. On the other hand, to reduce the number of planetary gears to two without compromising the strength of the speed reduction mechanism, it is necessary to increase the diameter of each planetary gear, which results in the problem that the speed reduction mechanism becomes large in size.

In the speed reduction mechanism 30 of this embodiment, the second tooth portions 12e of the three planetary gears 12a, 12b, and 12c are formed in a spiral shape, and the spiral second tooth portion 12e meshes with the first tooth portion 11a of the pinion gear 11, which is a sun gear. At this time, the first tooth portion 11a of the pinion gear 11 is also formed in a spiral shape. Moreover, the pinion gear 11 and the three planetary gears 12a, 12b, and 12c mesh with each other, and the three planetary gears 12a, 12b, and 12c also mesh with the internal gear 13 that includes the third tooth portion 13a formed in a spiral shape. As a result, the meshing ratio between the gears is increased, which increases the strength of each tooth surface and thereby ensures the strength of the speed reduction mechanism 30.

Additionally, the pinion gear 11 including the spiral first tooth portion 11a, the three planetary gears 12a, 12b, and 12c each including the second tooth portion 12e formed in a spiral shape, and the internal gear 13 including the spiral third tooth portion 13a mesh with one another, and these gears mesh continuously, so each gear rotates smoothly.

Thereby, vibration due to rotation of each gear can be suppressed, and vibration of the speed reduction mechanism 30 can be suppressed.

Furthermore, the second tooth portions 12e of the three planetary gears 12a, 12b, and 12c mesh in a state of being in contact with the arc-shaped portion 11b of the first tooth portion 11a of the pinion gear 11. Besides, each of the three planetary gears 12a, 12b, and 12c has a shape to mesh at a tooth tip circle 12g which is smaller than a pitch circle 12f, as shown in FIG. 6. Originally, the gears often mesh at the tooth tip circle 12g larger than the pitch circle 12f, but in the case of the planetary gears 12 that mesh with the single-tooth pinion gear 11, the pitch circle 12f is larger than the tooth tip circle 12g. Thus, in the speed reduction mechanism 30 of this embodiment, each of the three planetary gears 12a, 12b, and 12c meshes at the tooth tip circle 12g shown in FIG. 6, making it possible to reduce the diameter of each of the three planetary gears 12a, 12b, and 12c. As a result, the speed reduction mechanism 30 can be made small in size.

That is, even though the structure in the speed reduction mechanism 30 has three planetary gears 12a, 12b, and 12c, the strength of the speed reduction mechanism 30 can be ensured without increasing the diameter of each planetary gear. In other words, the strength of the speed reduction mechanism 30 can be ensured while reducing the size of the speed reduction mechanism 30. That is, in the speed reduction mechanism 30, it is possible to increase the reduction ratio while achieving downsizing.

Regarding the speed reduction mechanism 30 including the single-tooth pinion gear 11 and a plurality of planetary gears 12 meshing with the pinion gear 11, the conditions for arranging the planetary gears 12 so that adjacent planetary gears 12 mesh without interference will be illustrated next. For the speed reduction mechanism 30 having the above-described structure, when the number of planetary gears 12 is three or more, it is necessary to avoid interference between the planetary gear 12 and the adjacent planetary gear 12, and since it also depends on the strength of the speed reduction mechanism 30, it is necessary to decide how many planetary gears 12 to set in the design at the initial stage of designing the speed reduction mechanism 30.

First, the interference between planetary gears using a general involute gear 40 shown in FIG. 9 will be described. Formula (A) for determining whether there is interference in the case of the general involute gear 40 is shown as follows.

$$2 + Zb < (Za + Zb) \times \sin(180°/N) \quad \text{formula (A)}.$$

Here, Za is the number of teeth of the sun gear, Zb is the number of teeth of the planetary gear 12, and N is the number of planetary gears. In formula (A), the value of sin is a variable that takes a value between 1 and −1. It should be noted that since the value of sin in formula (A) is not a function that increases the value on the right side, the value of sin is assumed to be 1, which is the maximum value, ignoring the number N of planetary gears. At this time, in the case where the sun gear is the single-tooth pinion gear 11, Za=1, so formula (A) becomes (2+Zb)<(1+Zb). In this formula (2+Zb)<(1+Zb), all the values on the right side are less than the values on the left side, so this inequality does not hold. The above formula (A) only holds true in the case where the number of teeth Za of the sun gear is 3 or more, and is not applicable to the case where the sun gear is the single-tooth pinion gear 11 as in the speed reduction mechanism 30 of this embodiment. Therefore, it is necessary to devise conditions suitable for the case where the sun gear is the single-tooth pinion gear 11.

First, conditions for avoiding interference between adjacent planetary gears when three planetary gears 12 are provided in the speed reduction mechanism 30 using the single-tooth pinion gear 11 as the sun gear will be described. The tooth tip circle 12g of the planetary gear 12 is determined by the specifications of the single-tooth pinion gear 11, and features a smaller diameter than the pitch circle 12f of the planetary gear 12. When the specifications of the single-tooth pinion gear 11 are undetermined, the pitch circle 12f of the planetary gear 12 is taken into consideration in place of the tooth tip circle 12g of the planetary gear 12 as the conditions for avoiding interference.

Figure 7:
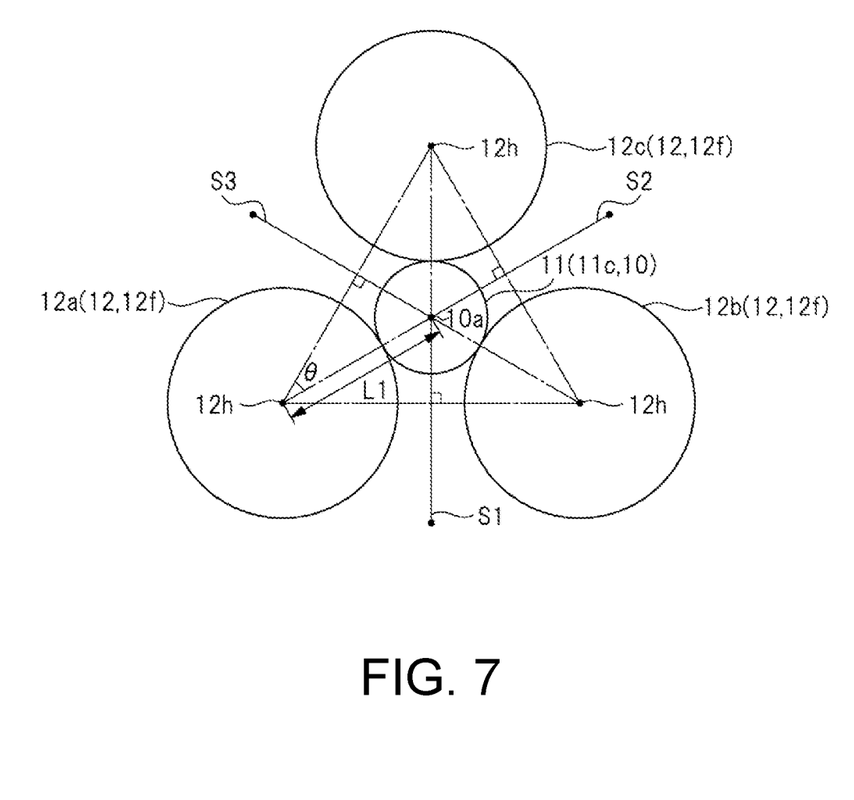
FIG. 7 is a diagram for calculating non-interference conditions between gears in the structure in which three planetary gears are provided in the speed reduction mechanism of FIG. 1.

In the case where the sun gear is the single-tooth pinion gear 11, assuming that the radius of the pitch circle 12f of the planetary gear 12 as shown in FIG. 6 is R1, interference avoidance limit lines S1, S2, and S3 are set as shown in FIG. 7, and the distance (center-to-center distance) between the center (rotation center 10a) of the pitch circle 11c of the single-tooth pinion gear 11 and the center (rotation center 12h) of the pitch circle 12f of the planetary gear 12 is L1, the following formula (B) holds true.

Pitch circle radius $R1$ of planetary gear 12<(center-to-center distance $L1 \times \cos \theta$)     formula (B)

Figure 9:
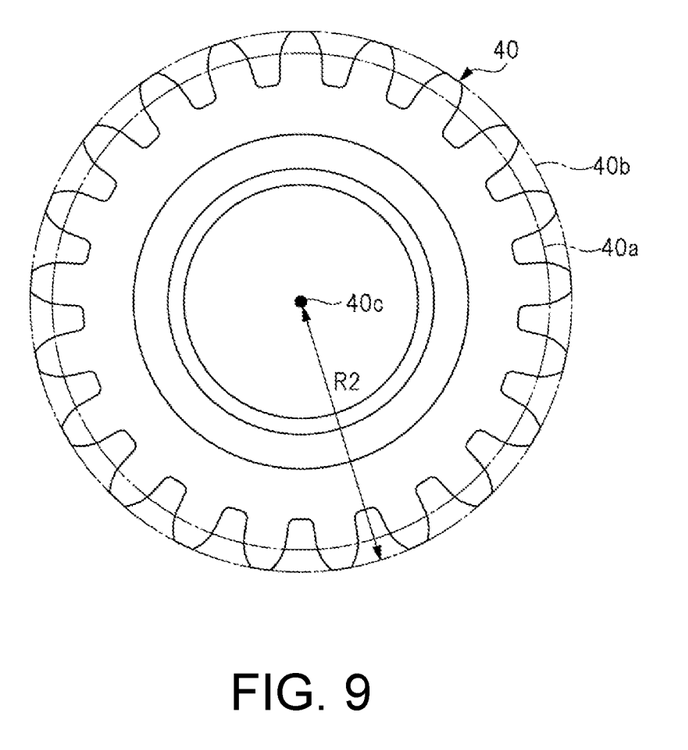
FIG. 9 is a plan view illustrating the pitch circle diameter of an involute gear as a comparative example.

It should be noted that in the case where the planetary gear 12 is a general involute gear 40 as shown in FIG. 9, it is considered to use a tooth tip circle 40b that is larger than a pitch circle 40a in the involute gear 40. That is, assuming that the tooth tip circle radius of the involute gear 40 is R2, and the distance (center-to-center distance) between the center (rotation center 10a) of the pitch circle 11c of the single-tooth pinion gear 11 and the center (rotation center 40c) of the tooth tip circle 40b of the involute gear 40 is L1, the following formula (C) holds true.

Tooth tip circle radius $R2$ of involute gear 40<(center-to-center distance $L1 \times \cos \theta$)     formula (C)

At this time, the angle $\theta$ can be calculated based on the following formula (D).

$\theta = (180° (\text{sum of interior angles of triangle}) - 90°) - (360°/\text{number of planetary gears}/2)$     formula (D)

That is, in the case where three planetary gears 12 are provided, the speed reduction mechanism 30 of this embodiment is capable of avoiding interference between adjacent planetary gears by setting the relationship to pitch circle radius R1 of planetary gear 12<(center-to-center distance $L1 \times \cos \theta$).

Figure 8:
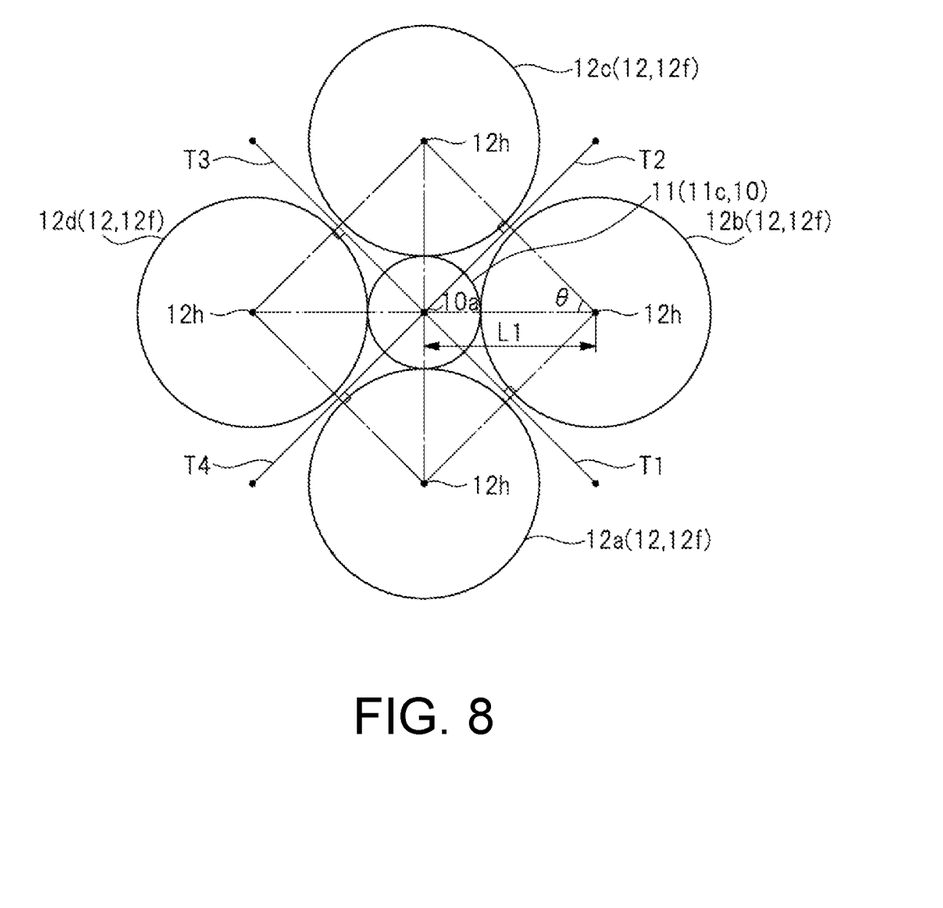
FIG. 8 is a diagram for calculating non-interference conditions between gears in the structure in which four planetary gears are provided in the speed reduction mechanism of FIG. 1.

Next, conditions for avoiding interference between adjacent planetary gears when four planetary gears 12 are provided in the speed reduction mechanism 30 using the single-tooth pinion gear 11 as the sun gear will be described. That is, this is a case where four planetary gears 12a, 12b, 12c, and 12d are provided to mesh with the single-tooth pinion gear 11.

First, interference avoidance limit lines T1, T2, T3, and T4 are set as shown in FIG. 8. Further, in the case where the sun gear is the single-tooth pinion gear 11, assuming that the radius of the pitch circle 12f of the planetary gear 12 shown in FIG. 6 is R1, and the distance (center-to-center distance) between the center (rotation center 10a) of the pitch circle 11c of the single-tooth pinion gear 11 and the center (rotation center 12h) of the pitch circle 12f of the planetary gear 12 is L1, the following formula (B) holds true, as in the case where three planetary gears 12 are provided.

Pitch circle radius $R1$ of planetary gear 12<(center-to-center distance $L1 \times \cos \theta$)     formula (B)

At this time, the angle $\theta$ can be calculated based on the following formula (D), as in the case where three planetary gears 12 are provided.

$\theta = (180° (\text{sum of interior angles of triangle}) - 90°) - (360°/\text{number of planetary gears}/2)$     formula (D)

In other words, even in the case where four planetary gears 12 are provided, the speed reduction mechanism 30 of this embodiment is capable of avoiding interference between adjacent planetary gears by setting the relationship to pitch circle radius R1 of planetary gear 12<(center-to-center distance $L1 \times \cos \theta$).

Next, an application example of the speed reduction mechanism 30 of this embodiment will be described.

Figure 10:
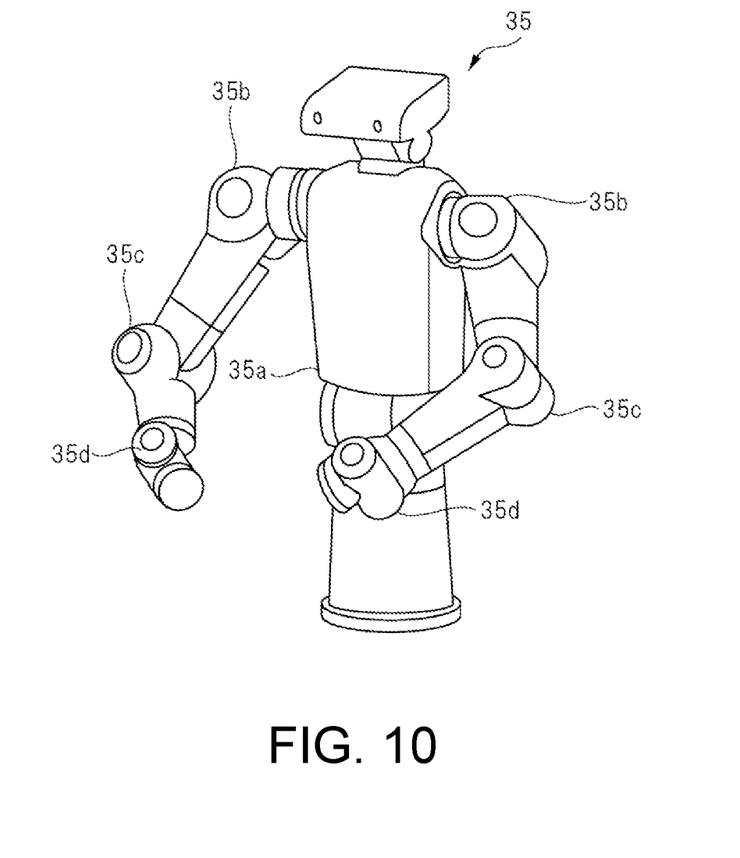
FIG. 10 is a perspective view illustrating the structure of the robot that is an application example of the speed reduction mechanism in FIG. 1.
Figure 11:
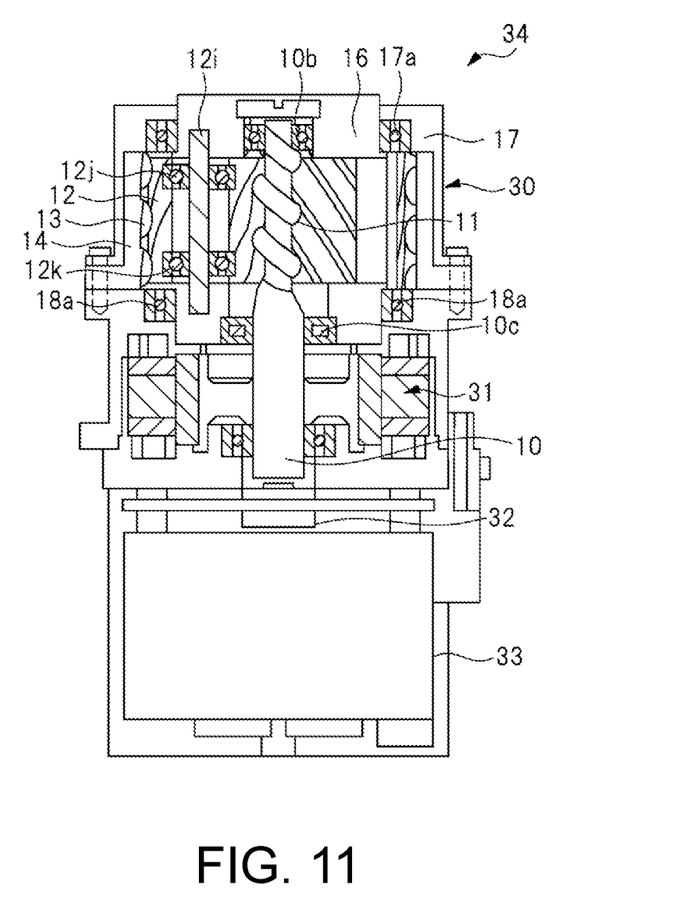
FIG. 11 is an internal structure view illustrating the application structure of the speed reduction mechanism of FIG. 1 in the robot of FIG. 10.

The speed reduction mechanism 30 is applicable to an industrial robot 35 as shown in FIG. 10, for example. The robot 35 includes, for example, a body part 35a, shoulder parts 35b attached to the body part 35a, elbow parts 35c connected to the shoulder parts 35b, and wrist parts 35d connected to the elbow parts 35c. A motor unit 34 provided with the speed reduction mechanism 30 as shown in FIG. 11 is incorporated into each of the above-mentioned parts. Each motor unit 34 includes a motor 31, the speed reduction mechanism 30 of this embodiment, an encoder 32, and a driver board 33. The rotating shaft 10 of the motor 31 is the input shaft of the speed reduction mechanism 30, and as the rotating shaft 10 is driven by the motor 31 to rotate, the output shaft 15 (see FIG. 1) decelerated by the speed reduction mechanism 30 rotates.

Incorporating the motor unit 34 provided with the speed reduction mechanism 30 of this embodiment into various parts of the robot 35 reduces the size of the speed reduction mechanism 30, thereby making the robot 35 more compact.

According to the speed reduction mechanism 30 of this embodiment, the speed reduction mechanism 30 can be made small in size, so the load on the motor 31 that operates the speed reduction mechanism 30 can be reduced. As a result, the motor unit 34 including the speed reduction mechanism 30 is enabled to operate efficiently. Thus, it is possible to contribute to particularly Goal 7 (Ensure access to affordable, reliable, sustainable and modern energy for all) and Goal 13 (Take urgent action to combat climate change and its impacts) in the Sustainable Development Goals (SDGs) led by the United Nations.

It goes without saying that the disclosure is not limited to the embodiments described above, and can be modified in various ways without departing from the spirit thereof. For example, the above embodiment illustrates a case where the speed reduction mechanism 30 is applied to the motor unit 34 incorporated into each part of the robot 35, but the disclosure is also applicable to a motor unit that is provided with a drive source for a wiper device mounted on a vehicle, or other drive sources such as a power window device or a sunroof device.

What is claimed is:

1. A speed reduction mechanism, comprising:
    a rotating shaft;
    a first gear provided on an outer peripheral portion of the rotating shaft and comprising a first tooth portion that extends spirally along a longitudinal direction of the rotating shaft;
    a plurality of second gears each comprising a spiral second tooth portion that meshes with the first tooth portion and arranged side by side in a circumferential direction of the rotating shaft;
    a housing portion housing the plurality of second gears; and a third gear provided on an inner peripheral portion of the housing portion and comprising a spiral third tooth portion that meshes with the second tooth portion, wherein the first tooth portion has at least a part of a tooth profile cross section formed in an arc shape, and the second tooth portion meshes with the first tooth portion in a state of being in contact with a portion where the tooth profile cross section is arc-shaped, wherein in a case where a pitch circle radius of the second gear is R1, a center-to-center distance from a rotation center of the rotating shaft to a rotation center of the second gear is L1, and an angle calculated by a formula of (180°(sum of interior angles of triangle)−90°)−(360°/number of the second gears/2) is θ, the pitch circle radius R1<(the center-to-center distance L1×cos θ).

2. The speed reduction mechanism according to claim 1, wherein at least three second gears are arranged side by side in the circumferential direction of the rotating shaft.

\* \* \* \* \*